United States Patent
Lee et al.

(10) Patent No.: US 11,527,986 B2
(45) Date of Patent: Dec. 13, 2022

(54) APPARATUS OF TRANSFERRING AN OBJECT AND METHOD OF CONTROLLING THE SAME

(71) Applicant: SEMES CO., LTD., Cheonan-si (KR)

(72) Inventors: Jun Beom Lee, Hwaseong-si (KR); Yeong Jae Choi, Hwaseong-si (KR)

(73) Assignee: SEMES CO., LTD., Cheonan-si (KR)

(*) Notice: Subject to any disclaimer, the term of this patent is extended or adjusted under 35 U.S.C. 154(b) by 0 days.

(21) Appl. No.: 16/952,821

(22) Filed: Nov. 19, 2020

(65) Prior Publication Data
US 2021/0167716 A1 Jun. 3, 2021

(30) Foreign Application Priority Data
Dec. 3, 2019 (KR) .......................... 10-2019-0159074

(51) Int. Cl.
- H02P 29/028 (2016.01)
- H02P 23/20 (2016.01)
- B65G 1/04 (2006.01)

(52) U.S. Cl.
CPC ............ *H02P 29/028* (2013.01); *H02P 23/20* (2016.02); *B65G 1/0457* (2013.01); *B65G 2201/0297* (2013.01)

(58) Field of Classification Search
CPC ........ H02P 29/02; H02P 29/10; H02P 29/028; H02P 23/20; G05B 2219/37342;
(Continued)

(56) References Cited

U.S. PATENT DOCUMENTS

| | | | |
|---|---|---|---|
| 6,771,032 B2 * | 8/2004 | Cox-Smith .......... | G05B 19/406 244/11 OB |
| 2011/0181223 A1 * | 7/2011 | Lee ........................ | H02P 23/14 318/432 |

(Continued)

FOREIGN PATENT DOCUMENTS

| | | | | | |
|---|---|---|---|---|---|
| JP | 2004090267 A | * | 3/2004 | ............. | B41J 29/38 |
| JP | 2004350408 A | * | 12/2004 | | |

(Continued)

OTHER PUBLICATIONS

English translation of Korean Office Action, corresponding to Korean Application No. 10-2019-0159074, dated Jan. 21, 2021.

*Primary Examiner* — Bickey Dhakal
(74) *Attorney, Agent, or Firm* — Kile Park Reed & Houtteman PLLC

(57) ABSTRACT

An apparatus includes a servo motor being configured to drive a traveling part for transferring an object along a traveling rail, a servo driver being configured to control an operation of the servo motor with adjusting a torque of the servo motor according to a load level, an overload determination unit being configured to check a degree of overload of the servo driver and a motion controller being configured to generate a speed signal and a speed profile according to a transfer command which a control unit of controlling an operation of the traveling part transmits thereto, the motion controller generating either a normal speed profile when the servo driver is not at an overload state or a corrected speed profile when the servo driver is at the overload state, and transmitting the speed signal and the speed profile to the servo driver.

11 Claims, 3 Drawing Sheets

(58) Field of Classification Search
CPC ........... G05B 2219/39263; G05B 2219/42325; G05B 19/4062
See application file for complete search history.

(56) References Cited

U.S. PATENT DOCUMENTS

2012/0109374 A1* 5/2012 Lee ..................... G05B 19/416
  700/245
2015/0042252 A1* 2/2015 Kitagawa ................. H02P 7/06
  318/434

FOREIGN PATENT DOCUMENTS

| | | | |
|---|---|---|---|
| JP | 4002827 B2 | * | 11/2007 |
| JP | 4330104 B2 | * | 9/2009 |
| KR | 10-2011-0087171 | | 8/2011 |

* cited by examiner

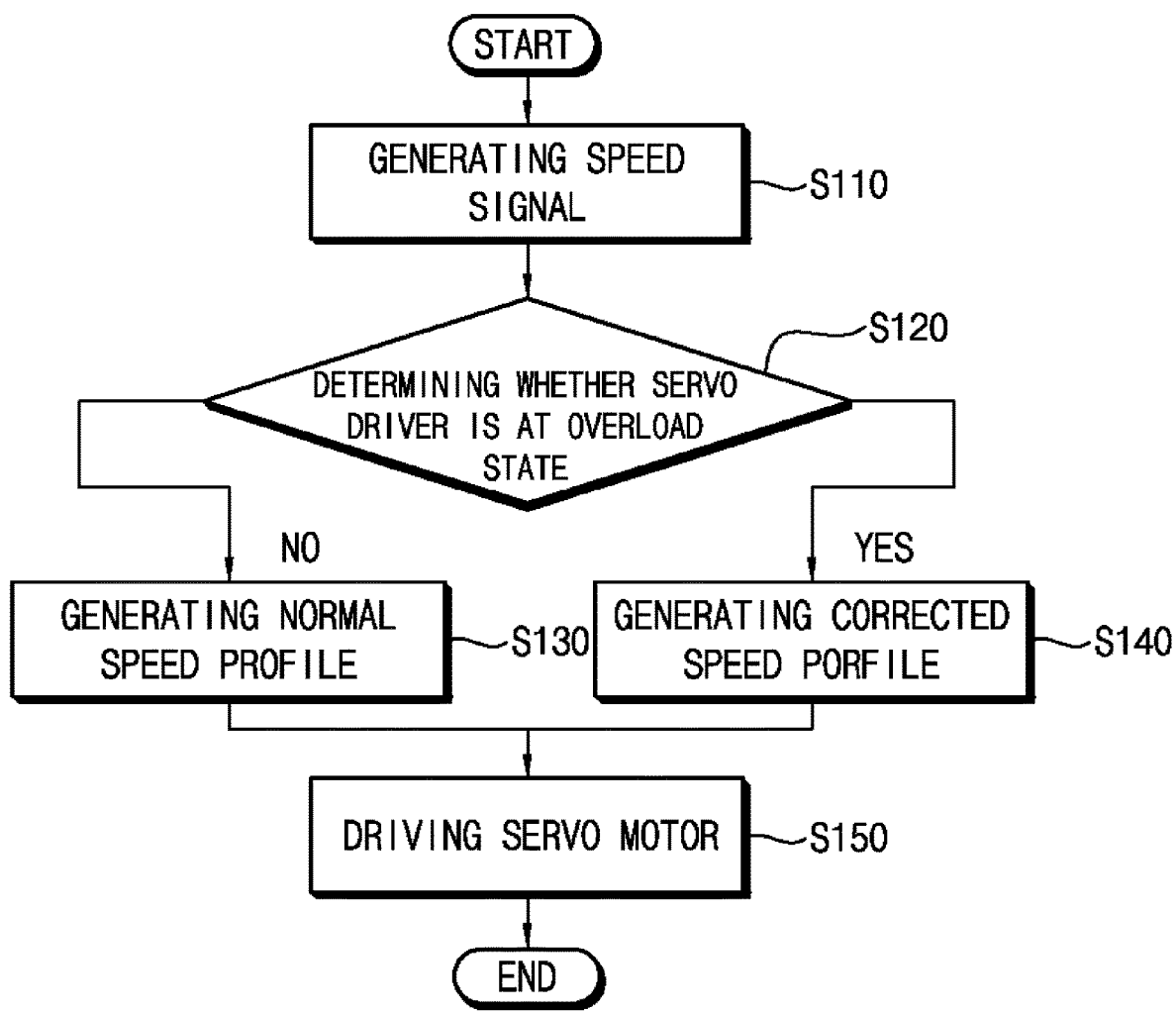

APPARATUS OF TRANSFERRING AN OBJECT AND METHOD OF CONTROLLING THE SAME

TECHNICAL FIELD

The present disclosure relates to an apparatus of transferring an object and a method of controlling the same. More particularly, the present invention relates to an apparatus of transferring an object for performing a semiconductor device and a method of controlling the apparatus of transferring the object.

BACKGROUND

In general, a plurality of semiconductor manufacturing equipments is in serial arranged to perform various processes for manufacturing semiconductor devices. An apparatus of transferring an object may transport an object along the semiconductor manufacturing equipments for performing each semiconductor producing process.

The apparatus travels along a traveling rail provided in a space in which the semiconductor manufacturing equipments are provided, and may be controlled by a control unit.

A servo motor included in the apparatus of transferring the object may provide a traveling part with a power. A servo driver may control the servo motor.

When the servo driver generate a driving command to transmit the driving command to the servo motor or when a front obstacle is released, the servo motor may start to drive the travelling part.

The servo driver may be limited to operate at more than a rated value only for a predetermined period of time. That is, when the servo driver operates at more than a rated value for over the predetermined period of time, an overload occurs to the servo driver, and the servo driver may stop to operate to make an emergency situation accidently. Thus, when designing a motion of the servo driver, a sufficient margin of the rated value may be secured to suppress the servo driver from occurring to be overloaded. Here, the margin is defined by subtracting the rate value from a maximum value for operating the servo motor.

Since the servo driver cannot drive the servo motor at the maximum value and does drive just at less than the rated value, the apparatus of transferring an object cannot avoid transferring the object at a relatively low moving speed. Therefore, it would be necessary to improve the transfer efficiency of the apparatus of an object.

SUMMARY

The embodiments of the present invention provides an apparatus of transferring an object capable of correcting a normal speed profile for driving a servo motor according to an overload degree of a servo driver to generate a corrected speed profile to be provided to a servo motor.

The embodiments of the present invention provides a method of controlling an apparatus of transferring an object capable of correcting a normal speed profile for driving a servo motor according to an overload degree of a servo driver to generate a corrected speed profile.

According to example embodiments of the present invention, disclosed is an apparatus of transferring an object. The apparatus includes a servo motor being configured to drive a traveling part for transferring an object along a traveling rail, a servo driver being configured to control an operation of the servo motor with adjusting a torque of the servo motor according to a load level, an overload determination unit being configured to check a degree of overload of the servo driver and a motion controller being configured to generate a speed signal and a speed profile according to a transfer command which a control unit of controlling an operation of the traveling part transmits thereto, the motion controller generating either a normal speed profile when the servo driver is not at an overload state or a corrected speed profile when the servo driver is at the overload state, and transmitting the speed signal and the speed profile to the servo driver.

In an example embodiment, the motion controller may generate the corrected speed profile having a constant speed section and an acceleration section, when the servo driver is at the overload state.

Here, the motion controller may generate the corrected speed profile having a first acceleration section having a first acceleration rate, a constant speed section and a second acceleration section having a second acceleration rate higher than the first acceleration rate, when the servo driver is at the overload state.

In an example embodiment, the motion controller may generate the corrected speed profile having a first acceleration section having a first acceleration rate and a second acceleration section having a second acceleration rate higher than the first acceleration rate, when the servo driver is at the overload state.

In an example embodiment, the overload determination unit may determinate whether the servo driver is at the overload state or not based on a non-operation time of the servo driver.

Here, the overload determination unit may include a timer being configured to measure the non-operation time of the servo driver.

In an example embodiment, the overload determination unit may define the normal speed profile to a maximum value greater than a rated value of the servo driver.

According to example embodiments of the present invention, disclosed is a method of controlling an apparatus of transferring an object. In detail, a speed signal is generated to be provided from a motion controller to a servo driver according to a transfer command which a control unit of controlling an operation of a traveling part transmits. Then, it is determined whether the servo driver is at an overload state. either a normal speed profile by the motion controller when the servo driver is not at the overload state, or a corrected speed profile corresponding to the overload state of the motion controller when the servo driver is at the overload state is generated. Then, the servo driver drives a servo motor according to either the normal speed profile or the corrected speed profile.

In an example embodiment, the corrected speed profile may include a constant speed section and an acceleration section, when the servo driver is at the overload state.

In an example embodiment, the corrected speed profile may include a first acceleration section having a first acceleration rate, a constant speed section and a second acceleration section having a second acceleration rate higher than the first acceleration rate, when the servo driver is at the overload state.

In an example embodiment, the corrected speed profile may include a first acceleration section having a first acceleration rate and a second acceleration section having a second acceleration rate higher than the first acceleration rate, when the servo driver is at the overload state.

In an example embodiment, determining whether the servo driver is at an overload state may be performed based on a non-operation time of the servo driver.

In an example embodiment, the normal speed profile may be defined to have a maximum value greater than a rated value of the servo driver.

The apparatus and the method of controlling the apparatus in accordance with example embodiments of the present invention may generate either the normal speed profile or the corrected speed profile according to whether the servo driver is overloaded. Since the speed profile can be adjusted according to whether the servo driver is at the overload state, the apparatus may have improved transport efficiency.

The above summary of the present disclosure is not intended to describe each illustrated embodiment or every implementation of the present disclosure. The detailed description and claims that follow more particularly exemplify these embodiments.

BRIEF DESCRIPTION OF THE DRAWINGS

Example embodiments can be understood in more detail from the following description taken in conjunction with the accompanying drawings, in which:

FIG. 5 is a flow chart illustrating a method of controlling an apparatus of transferring an object in accordance with an example embodiment of the present invention.

DETAILED DESCRIPTION

Figure 1:
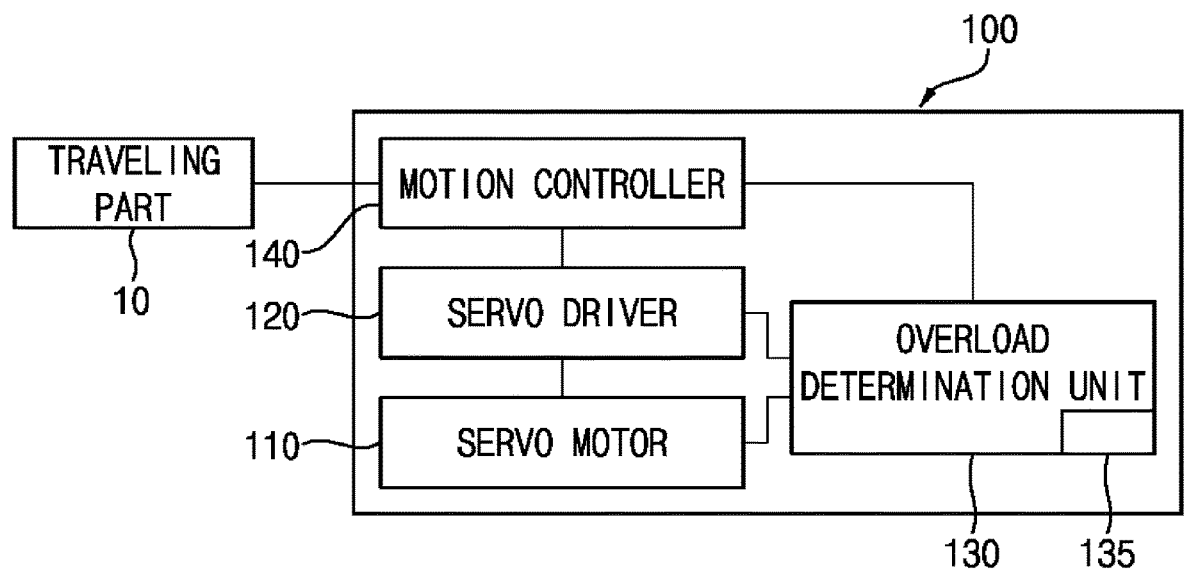
FIG. 1 is a block diagram illustrating an apparatus of transferring an object in accordance with an embodiment of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

Hereinafter, specific embodiments on a raceway unit and an OHT having the same will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout. In the figures, the dimensions of layers and regions are exaggerated for clarity of illustration.

The terms such as first, second, etc., can be used in describing various elements, but the above elements by the above terms should not be limited. The above terms are one element from the other used only to distinguish. For example, in the present invention without departing from the scope of the first component to the second component may be named similarly, the second component to the first component also can be named.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
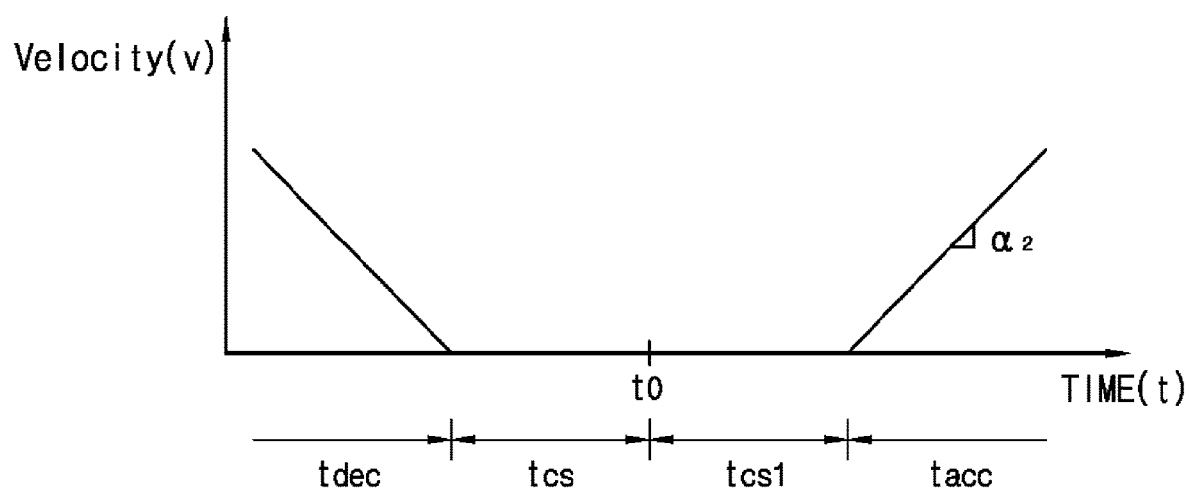
FIGS. 2 to 4 are graphs each showing a normal speed profile and a corrected speed profile generated by a motion controller in FIG. 1.

FIG. 1 is a block diagram illustrating an apparatus of transferring an object in accordance with an embodiment of the present invention. FIG. 2 is a graph showing an example of a normal speed profile and a corrected speed profile generated by a motion controller in FIG. 1.

Referring to FIGS. 1 and 2, an apparatus 100 of transferring an object according to an embodiment of the present invention may travel along a travelling rail to transfer an object.

The apparatus 100 of transferring an object may include a traveling part, a frame part, a sliding part, a hoist part and a hand part. The object may include a front opening unified pod (FOUP), a front opening shipping box (FOSB), a magazine, a tray, etc.

The traveling part may move along the travel rail. The sliding part is connected to the traveling part such that the hoist part moves in a horizontal direction. The hoist part may fix the hand part and move the hand part in a vertical direction. The hand part may fix the object. The slide part moves the object in the horizontal direction, and the hoist part may move the object in the vertical direction. Accordingly, the apparatus 100 including the traveling part, the sliding part, the hoist part and the hand part may transfer the object.

The apparatus 100 of transferring an object includes a servo motor 110, a servo driver 120, an overload determination unit 130, and a motion controller 140.

The servo motor 110, the servo driver 120, the overload determinant 130 and the motion controller 140 may be provided in the traveling part.

The servo motor 110 may provide a driving force for the traveling part to rotate a driving wheel included in the traveling part such that the apparatus 100 of transferring an object operates in the horizontal direction.

The servo driver 120 is connected to the servo motor 110. The servo driver 120 may control an operation of the servo motor 110.

Specifically, the servo driver 120 may control the servo motor 110 according to a speed profile which the motion controller 140 generates to be provided for the servo driver 120.

Meanwhile, the servo driver 120 may drive the servo motor 110. The servo driver 120 may operate at both a predetermined rated value and a maximum value greater than a predetermined rated value by about 10 to about 20%.

That is, the servo driver 120 may drive the servo motor 110 at the maximum value. In general, when the servo driver 120 drives the servo motor 110 at the rated value to have a margin of about 10-20% lower than the maximum value, the servo driver 120 may be suppressed from being overloaded owing to the margin of about 10 to about 20%. However, since the servo driver 120 may not drive the servo motor 110 at the maximum value, the servo driver 120 may have a poor efficiency.

The overload determination unit 130 may determine whether the servo driver 120 is overloaded or not. The overload determination unit 130 may determine whether there is an overload by measuring a non-operation time of the servo driver 120. The overload determination unit 130 may include a timer 135 that measures the operating time of the servo driver 120.

When the non-operation time of the servo driver 120 does not exceed to a standard value, the overload determination unit 130 may determine that the servo driver 120 is at an overloaded state. When the non-operation time of the servo driver 120 exceeds to the standard value, the overload determination unit 130 may determine that the servo driver 120 is not overloaded.

The motion controller 140 receives a transfer command of operating the apparatus 100 of transferring an object from a control unit 10 being configured to control an operation of the apparatus 100 of transferring an object. In addition, the motion controller 140 may generate a speed signal and a speed profile for the apparatus 100 of transferring an object in accordance with the transfer command, and may transmit the speed signal and the speed profile to the servo driver 120.

The speed signal may include information for calculating a constant speed value, an acceleration value, and a deceleration value for the apparatus 100 of transferring an object. The speed profile may include speed information which may vary in relation to a traveling time of the apparatus 100.

When the servo driver 120 is not at the overload state, the motion controller 140 generates a normal speed profile.

However, when the servo driver 120 is at the overload state, the motion controller 140 generates a corrected speed profile.

That is, a poor efficiency of the servo driver 120 which may occur due to the operation margin of the servo driver 120 described above may be required. When the servo driver 120 is stopped for a non-operation time equal to or greater than a reference value, the apparatus 100 either may move at a constant velocity or may remain in a stationary state, and the servo driver 120 may be sufficiently cooled.

Thus, the servo driver 120 may be set to drive the servo motor 110 at a maximum value greater than the rated value. Accordingly, the servo motor 110 may operate the traveling part to a maximum acceleration value. In this case, the motion controller 140 may generate a normal velocity profile having the maximum acceleration value. As a result, the servo driver 120 drives the servo motor 110 at a maximum value, thereby increasing an output value of the servo motor 110 to improve the efficiency of the apparatus 100.

Meanwhile, when the servo driver 120 has stopped for a non-operation time ($t_{cs}$) lower than the reference value, the servo driver 120 may be still at an overload state.

Accordingly, the motion controller 140 corrects the normal speed profile so that the servo driver 120 may stopped additionally as a non-operation time, that is, by an additional constant speed time $t_{cs1}$. When the additional non-operation time elapses and the servo driver 120 has a non-operation time greater than or equal to the reference value, the servo driver 120 may drive the servo motor 110 with a maximum value greater than the rated value. Accordingly, the servo motor 110 may operate the driving unit at a maximum acceleration rate. As a result, the normal speed profile is corrected to generate the correct speed profile including a constant speed section ($t_{cs1}$) and a maximum acceleration section ($t_{acc}$). The servo driver 120 may drive the servo motor 110 at a maximum value after the servo driver 120 is cooled. In a conclusion, the apparatus 100 may have an improved efficiency.

Figure 3:
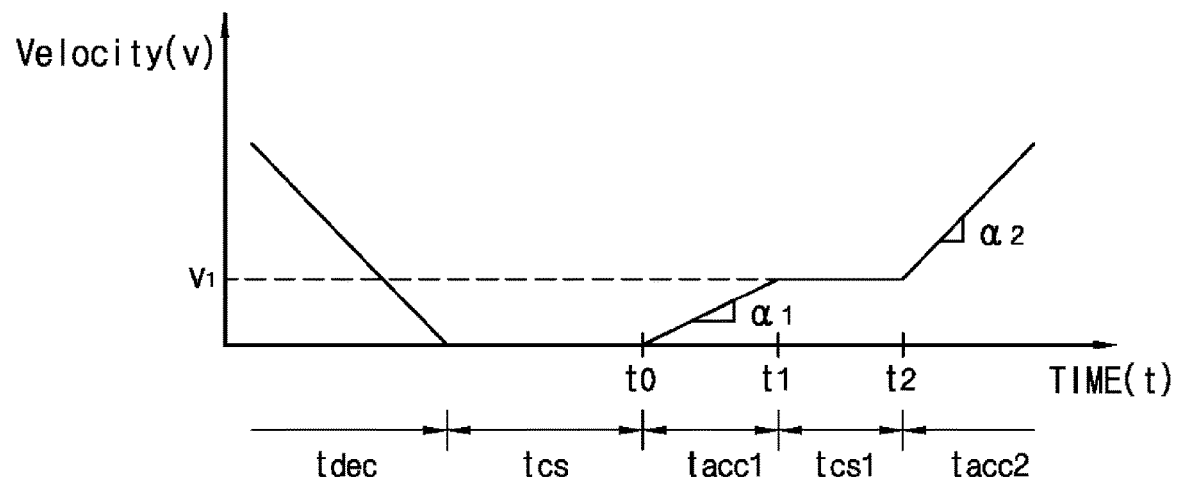

FIG. 3 is a graph showing another example of a normal speed profile and a corrected speed profile generated by a motion controller in FIG. 1.

Referring to FIG. 3, when the servo drive 120 is at an overload state, the motion controller 140 is configured to generate a correct speed profile including a first acceleration section $t_{acc1}$ having a first acceleration rate, a constant speed section $t_{cs1}$, a second acceleration section $t_{acc2}$ having a second acceleration rate higher that the first acceleration rate. In the first acceleration section $t_{acc1}$, the servo driver 120 may drive the servo motor 100 at the first acceleration rate lower than the second acceleration rate, that is, at a relatively low torque or current. Then, the servo driver 120 stops during the constant speed section $t_{cs1}$. Accordingly, the servo driver 120 may be released from the overload state. Then, the servo driver 120 drives the servo motor 110 at the second acceleration rate greater than the first acceleration rate of the second acceleration section tacc2. In the second acceleration section tacc2, the servo driver 120 may drive the servo motor 110 with a maximum value greater than the rated value. Accordingly, the servo motor 110 may operate the driving unit at the maximum acceleration rate.

Figure 4:
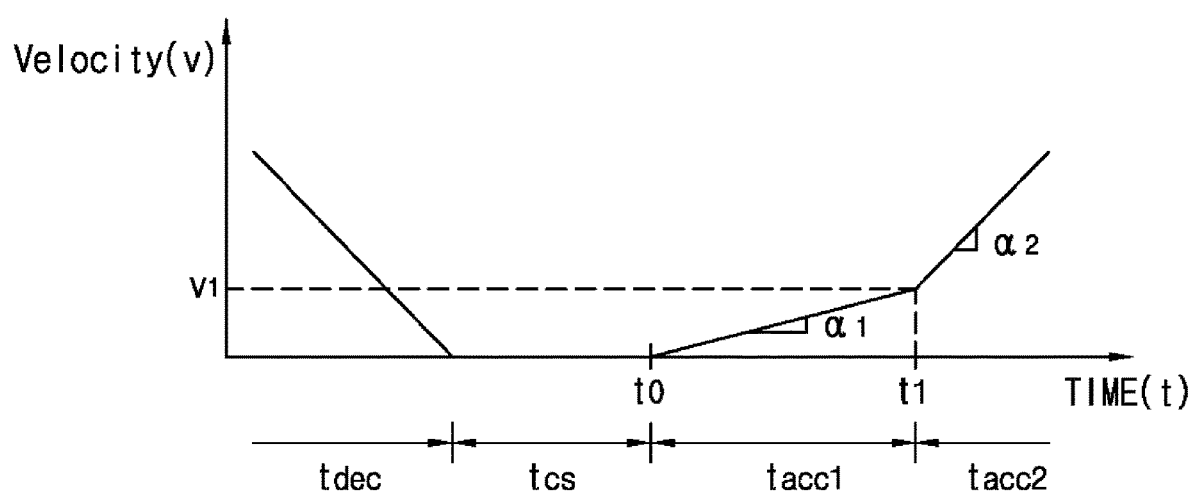

FIG. 4 is a graph showing still another example of a normal speed profile and a corrected speed profile generated by a motion controller in FIG. 1.

Referring to FIG. 4, when the servo drive 120 is at an overload state, the motion controller 140 is configured to generate a correct speed profile including a first acceleration section $t_{acc1}$ having a first acceleration rate and a second acceleration section $t_{acc2}$ having a second acceleration rate higher that the first acceleration rate. In the first acceleration section $t_{acc1}$, the servo driver 120 may drive the servo motor 100 at the first acceleration rate lower than the second acceleration rate, that is, at a relatively low torque or current. Accordingly, the servo driver 120 may be released from the overload state. Then, the servo driver 120 drives the servo motor 110 at the second acceleration rate greater than the first acceleration rate of the second acceleration section tacc2. In the second acceleration section tacc2, the servo driver 120 may drive the servo motor 110 with a maximum value greater than the rated value. Accordingly, the servo motor 110 may operate the driving unit at the maximum acceleration rate.

FIG. 5 is a flow chart illustrating a method of controlling an apparatus of transferring an object in accordance with an example embodiment of the present invention.

Referring to FIGS. 1 and 5, firstly, a speed signal is generated S110. The speed signal is providing for a servo driver 120 by a motion controller 140. The motion controller 140 generates the speed signal according to a transfer command which a control unit 10 S110 transmits to the motion controller 140.

The speed signal may include information on a constant speed value, an acceleration rate, and a deceleration rate of the object transfer device 100.

Next, an overload state of the servo driver 120 is determined S120.

When the servo driver 120 is not at the overload state, the servo driver 120 may drive the servo motor 110 with a normal speed profile that corresponds to a maximum value greater than a rated value. Accordingly, the transfer efficiency of the apparatus 100 of transferring an object may be improved.

When the servo driver 120 has stopped for a time longer than a reference value, it is determined that the servo driver 120 is not at an overload state or is released from the overload state. In these cases, the motion controller 140 may drive the servo driver 120 to a maximum value by generating a normal speed profile having a maximum value greater than a rated value.

When the servo driver 120 has stopped for a time less than the reference value, the servo driver 120 is determined to be at the overload state.

When the servo driver 120 is at the overload state, the motion controller 140 generates a corrected speed profile by correcting the normal speed profile for operating the servo driver S140. In this case, the corrected speed profile may have a constant speed section or a relatively low first acceleration section.

In the constant speed section, the servo driver 120 may be cooled by stopping the driving of the servo motor. Furthermore, in the first acceleration section, the servo driver 120 may be cooled by driving the motor with a relatively low acceleration rate.

Then, the servo driver 120 drives the servo motor 110 according to one of the normal speed profile and the corrected speed profile S150.

When the speed profile is the normal speed profile, the apparatus 100 may travel with maximum acceleration rate by operating the servo motor 110. In this case, the servo driver 120 may work at a maximum value greater than a rated value.

When the speed profile is the corrected speed profile, the servo motor 110 may work at the rated value, the apparatus 100 may achieve a relatively low efficiency due to the rate value less than the maximum value. For example, the corrected speed profile includes a constant speed section or a low acceleration section. After cooling the servo driver 120 to release from the overload state, the servo driver 120 may have a maximum value greater than the rated value. Accordingly, the servo motor may drive the driving unit at the maximum acceleration rate.

As described above, the apparatus of transferring an object and the method of controlling the apparatus in accordance with the present invention may generate either the normal speed profile or the corrected speed profile according to whether the servo driver is at the overload state. The apparatus may secure improved transport efficiency.

Although the example embodiments of the present invention have been described with reference to specific embodiments, they are not limited thereto. Therefore, it will be readily understood by those skilled in the art that various modifications and changes can be made thereto without departing from the spirit and scope of the present disclosure defined by the appended claims.

The invention claimed is:

1. An apparatus of transferring an object, the apparatus comprising:
   a servo motor being configured to drive a traveling part for transferring the object along a traveling rail;
   a servo driver being configured to control an operation of the servo motor with adjusting a torque of the servo motor according to a load level;
   an overload determination unit being configured to check a degree of overload of the servo driver; and
   a motion controller being configured to generate a speed signal and a speed profile according to a transfer command which a control unit of controlling an operation of the traveling part transmits thereto, the motion controller generating either a normal speed profile when the servo driver is not at an overload state or a corrected speed profile when the servo driver is at the overload state, and transmitting the speed signal and the speed profile to the servo driver,
   wherein the motion controller generates the corrected speed profile having a constant speed section and a positive acceleration section subsequently in succession with the constant section when the servo driver is at the overload state.

2. The apparatus of claim 1, wherein the motion controller generates the corrected speed profile having a preliminary acceleration section having a first acceleration rate, the constant speed section and the positive acceleration section having a second acceleration rate higher than the first acceleration rate, when the servo driver is at the overload state.

3. The apparatus of claim 1, wherein the overload determination unit determinates whether the servo driver is at the overload state or not based on a non-operation time of the servo driver.

4. The apparatus of claim 3, wherein the overload determination unit includes a timer being configured to measure the non-operation time of the servo driver.

5. The apparatus of claim 1, wherein the overload determination unit defines the normal speed profile to a maximum value greater than a rated value of the servo driver.

6. An apparatus of transferring an object, the apparatus comprising:
   a servo motor being configured to drive a traveling part for transferring an object along a traveling rail;
   a servo driver being configured to control an operation of the servo motor with adjusting a torque of the servo motor according to a load level;
   an overload determination unit being configured to check a degree of overload of the servo driver; and
   a motion controller being configured to generate a speed signal and a speed profile according to a transfer command which a control unit of controlling an operation of the traveling part transmits thereto, the motion controller generating either a normal speed profile when the servo driver is not at an overload state or a corrected speed profile when the servo driver is at the overload state, and transmitting the speed signal and the speed profile to the servo driver,
   wherein the motion controller generates the corrected speed profile having a first acceleration section having a first acceleration rate and a second acceleration section having a second acceleration rate higher than the first acceleration rate and being subsequently in succession with the first acceleration section when the servo driver is at the overload state.

7. A method of controlling an apparatus of transferring an object, the method comprising:
   generating a speed signal to be provided from a motion controller to a servo driver according to a transfer command which a control unit of controlling an operation of a traveling part transmits;
   determining whether the servo driver is at an overload state;
   generating a corrected speed profile corresponding to the overload state of the motion controller when the servo driver is at the overload state; and
   driving a servo motor by the servo driver according to the corrected speed profile,
   wherein the motion controller generates the corrected speed profile having a constant speed section and a positive acceleration section subsequently in succession with the constant section when the servo driver is at the overload state.

8. The method of claim 7, wherein the corrected speed profile includes a preliminary acceleration section having a first acceleration rate, the constant speed section and the positive acceleration section having a second acceleration rate higher than the first acceleration rate, when the servo driver is at the overload state.

9. The method of claim 7, wherein determining whether the servo driver is at the overload state is performed based on a non-operation time of the servo driver.

10. The method of claim 7, wherein the normal speed profile is defined to have a maximum value greater than a rated value of the servo driver.

11. A method of controlling an apparatus of transferring an object, the method comprising:

generating a speed signal to be provided from a motion controller to a servo driver according to a transfer command which a control unit of controlling an operation of a traveling part transmits;

determining whether the servo driver is at an overload state;

generating a corrected speed profile corresponding to the overload state of the motion controller when the servo driver is at the overload state; and driving a servo motor by the servo driver according to the corrected speed profile, wherein the corrected speed profile includes a first acceleration section having a first acceleration rate and a second acceleration section having a second acceleration rate higher than the first acceleration rate and being subsequently in succession with the first acceleration section when the servo driver is at the overload state.

* * * * *